United States Patent
Janakiraman et al.

(10) Patent No.: US 8,171,063 B1
(45) Date of Patent: May 1, 2012

(54) SYSTEM AND METHOD FOR EFFICIENTLY LOCATING AND PROCESSING DATA ON A DEDUPLICATION STORAGE SYSTEM

(75) Inventors: Viswesvaran Janakiraman, San Jose, CA (US); Bruce Robert Montague, Santa Cruz, CA (US)

(73) Assignee: Symantec Corporation, Mountain View, CA (US)

( * ) Notice: Subject to any disclaimer, the term of this patent is extended or adjusted under 35 U.S.C. 154(b) by 273 days.

(21) Appl. No.: 12/495,274

(22) Filed: Jun. 30, 2009

(51) Int. Cl.
*G06F 17/00* (2006.01)
(52) U.S. Cl. .................... 707/822; 707/692; 707/791
(58) Field of Classification Search .................. 707/822, 707/692, 791
See application file for complete search history.

(56) References Cited

U.S. PATENT DOCUMENTS

2010/0077013 A1* 3/2010 Clements et al. ............. 707/822
* cited by examiner

*Primary Examiner* — Belix M Ortiz
(74) *Attorney, Agent, or Firm* — Campbell Stephenson LLP

(57) ABSTRACT

A system and method for efficiently locating and processing data on a deduplication storage system are provided. A logical volume is mapped to a deduplication storage area. The logical volume includes a collection of logical block locations and the deduplication storage area includes a collection of physical block locations. The collection of logical block locations is mapped to the collection of physical block locations. A filesystem organizes the logical volume by organizing the logical block locations into a collection of files. Reverse-mapping information is generated for a logical block location that associates the logical block location with at least one file. In response to receiving a logical block address of a logical block location, at least one file is returned.

20 Claims, 11 Drawing Sheets

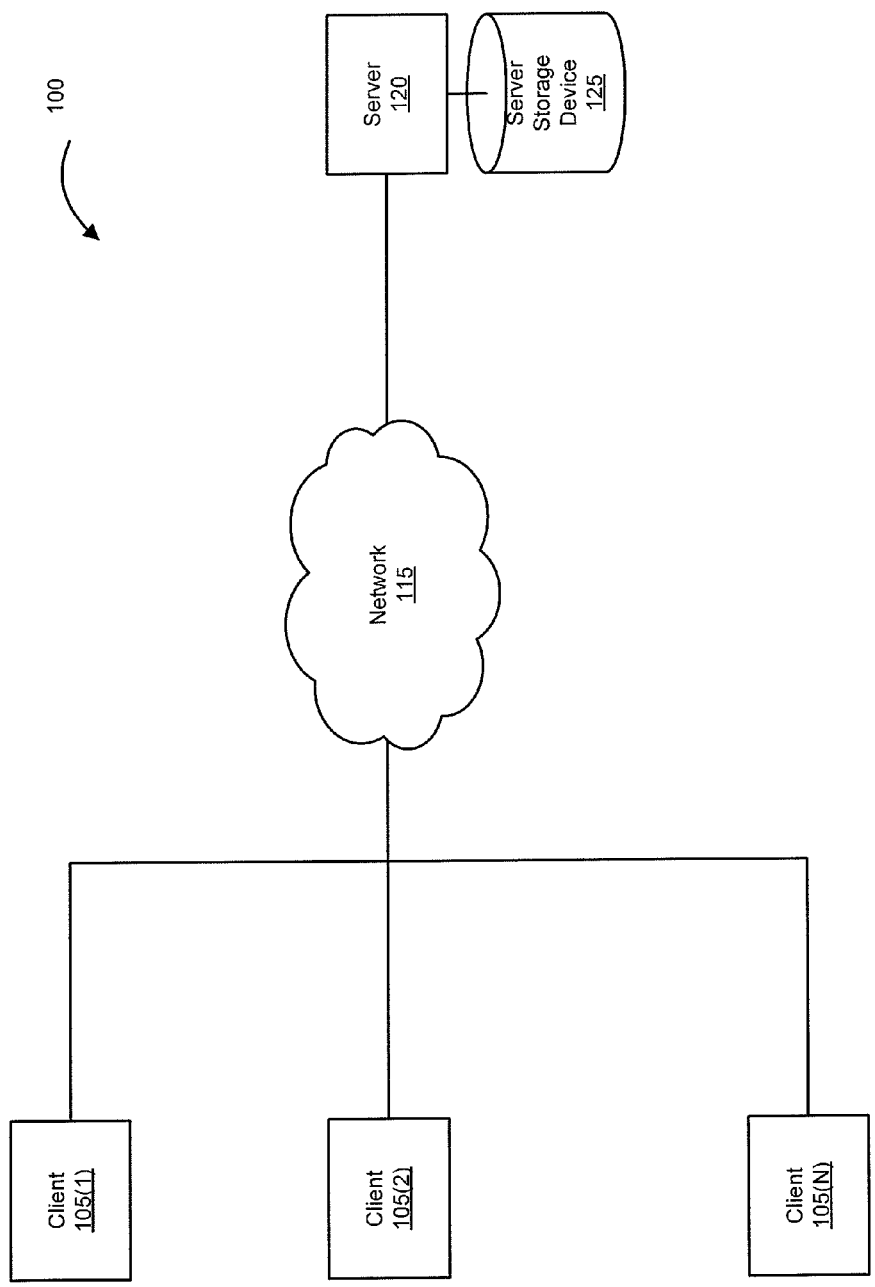

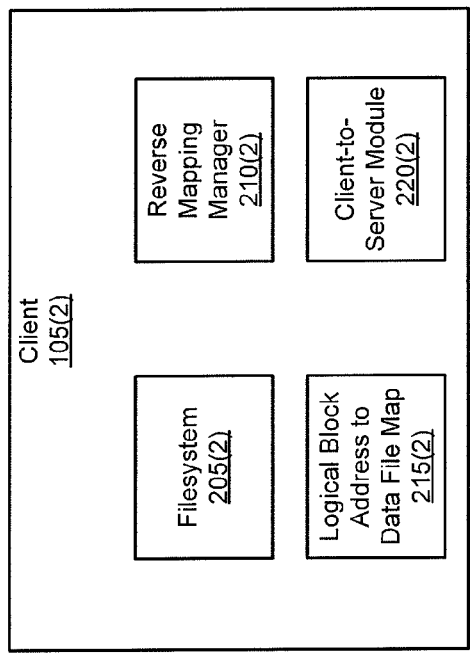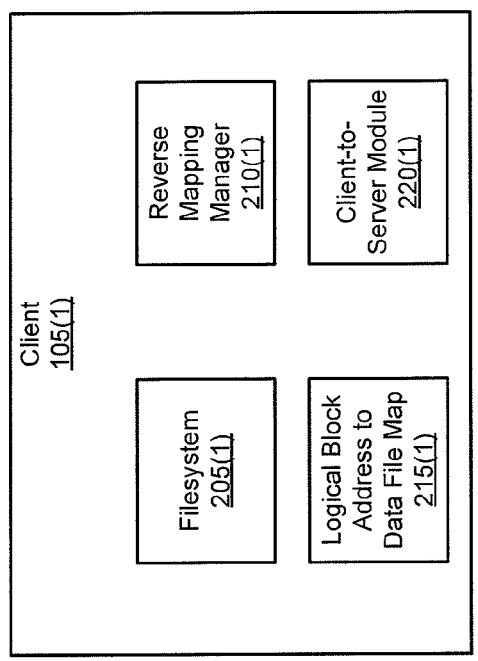
Fig. 2A

| LBA
405 | FILENAME
415 |
|---|---|
| 1 | |
| 2 | |
| 3 | FILE A |
| 4 | FILE B |
| 5 | FILE B |
| 6 | FILE A |
| 7 | |
| 8 | |
| 9 | FILE A |

*Fig. 4*

SYSTEM AND METHOD FOR EFFICIENTLY LOCATING AND PROCESSING DATA ON A DEDUPLICATION STORAGE SYSTEM

FIELD OF THE INVENTION

This invention relates to storage systems and, more particularly, to locating and processing data in a deduplication storage system.

DESCRIPTION OF THE RELATED ART

In many of today's organizations, widespread access to data has become commonplace. To provide widespread access, many organizations and individuals access information via a computer network. For example, a server, which is further coupled to a storage device or storage network, services data access requests from clients. While widespread access to data is desirable, many copies of the same data can be stored by the server on the storage device or storage network. Storing and processing the redundant copies of data is time and resource intensive.

SUMMARY OF THE INVENTION

Embodiments provide a system and method for efficiently locating and processing data on a deduplication storage system. A logical volume is mapped to a deduplication storage area. The logical volume includes a collection of logical block locations and the deduplication storage area includes a collection of physical block locations. The collection of logical block locations is mapped to the collection of physical block locations. A filesystem organizes the logical volume by organizing the logical block locations into a collection of files. Reverse-mapping information is generated for a logical block location that associates the logical block location with at least one file. In response to receiving a logical block address of a logical block location, at least one file is returned.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 1 is a block diagram of a distributed system that maintains a reverse data-to-file mapping for a data deduplication system, according to one embodiment.

FIG. 2A is a block diagram of clients for reading or both reading and modifying data in a data deduplication system, according to one embodiment.

FIG. 4 is an example of a logical block address-to-data file map used to associate logical block addresses with data files on a data deduplication system, according to one embodiment.

DETAILED DESCRIPTION

Introduction

Figure 2B:
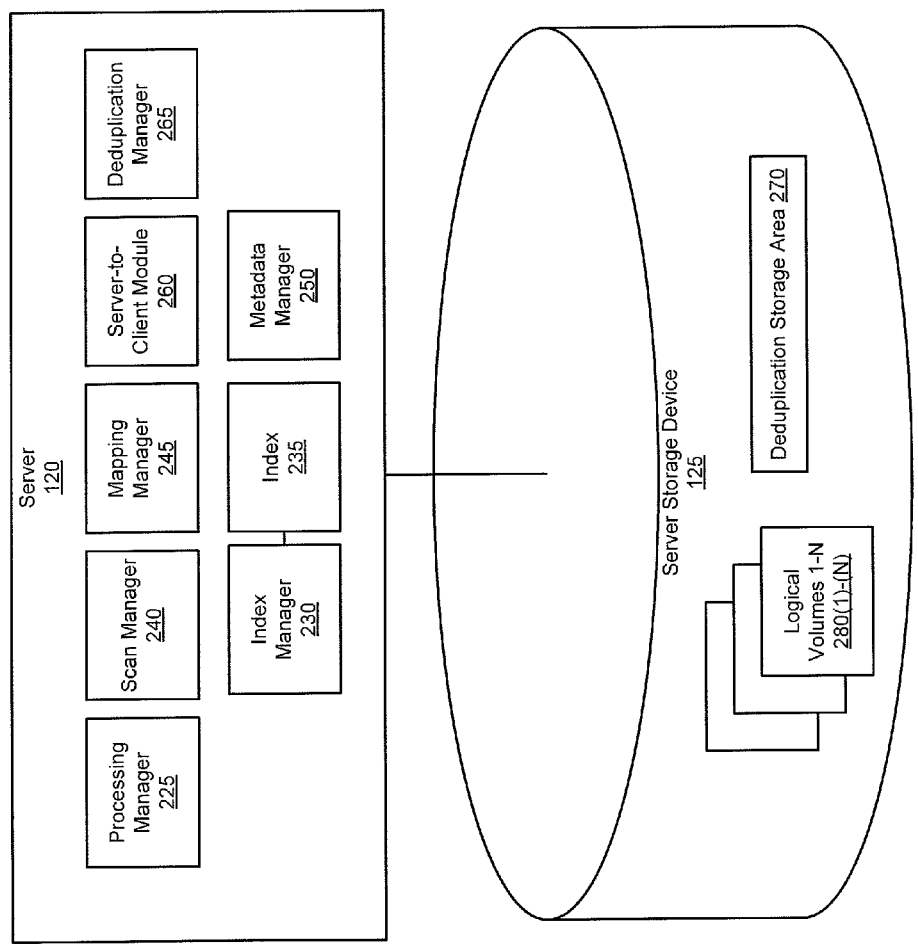
FIG. 2B is a block diagram of a server for locating and processing data in a data deduplication system, according to one embodiment.

Embodiments provide a system and method of locating and processing data on a deduplication storage system. According to one embodiment, a server is coupled to a server storage device. Clients are coupled to the server, either directly or via a network, in order to access data stored in the server storage device. The server storage device includes a block-level deduplication storage area for storing blocks of data such that only one particular block of data is stored in the deduplication storage area at a time.

The server creates logical volumes to present a multiple logical views of the data blocks in the deduplication storage area. The logical block locations of the logical volumes map back to physical block locations within the deduplication storage area. Clients access the logical block locations of the logical volumes via a filesystem, which organizes the logical block locations into files and directories. Thus, when accessing the logical volumes via the filesystem, the clients modify or read and modify data on the server storage device.

The clients also implement a reverse-mapping manager that, given a logical block address of a logical block location within a logical volume, the reverse-mapping manager identifies files in the filesystem that include data blocks mapped by the logical block location. Reverse-mapping logical block address to files enable the system to perform functions on physical block locations in the deduplication storage area and extrapolate the result of the function to files of a filesystem, without actually performing the function on each file in the filesystem. These functions include, but are not limited to: locating duplicate files across multiple filesystems, searching for documents containing particular strings across multiple filesystems, and scanning physical block locations and mapping the scanned physical block locations to files organized by multiple filesystems.

Data Deduplication and Storage Virtualization

One technique employed to minimize the storage of redundant copies of data is data deduplication. Data deduplication systems inventory data stored on the data deduplication system, identify duplicate copies of data, and discard the duplicate copies of data so that only one instance of a particular unit of data is stored in the data deduplication system at one time.

Comparing the actual units of data to identify duplicate copies can be time and resource prohibitive. Thus, instead of comparing the actual units of data, smaller representations of the units of data (e.g., hash, checksum, and the like) are generated for each unit of data. Then, to identify duplicate copies of data, the representations are compared instead of comparing the actual units of data.

Data deduplication systems can be implemented as block-level deduplication systems, such that only one instance of a particular block of data is stored by the data deduplication system at one time. A block of data is a sequence of bytes or bits with a nominal length (e.g., a block size). A block can be of any size. A physical block location is a storage location used for storing a block of data.

According to one embodiment, a data deduplication system maintains a deduplication storage area within a computer-readable storage medium such as, for example, a disk drive, a flash drive, an optical drive, and the like. The deduplication storage area corresponds to a collection of physical block locations on the computer-readable storage medium. The collection of physical block locations is used to store blocks of data. The data deduplication system performs data deduplication on the deduplication storage area so that only one copy of a particular block of data is stored within the deduplication storage area at one time.

Storage virtualization is a technique used to provide storage location independence between the physical block location where a particular block of data is stored and the block address used to access the block of data. By using storage virtualization, logical address spaces or logical volumes can be generated. The logical volumes include logical block locations that map to physical block locations in a deduplication storage area of a data deduplication system.

Embodiments of the present invention enable the presentation of different views of the data stored in a deduplication storage area. For example, the logical block locations of a first logical volume can map back to every physical block location in the deduplication storage area while the logical block locations of a second logical volume map back to a subset of the physical block locations in the deduplication storage area. Thus, the first logical volume (a complete view of the deduplication storage area) presents a different view of the deduplication storage area than the second logical volume (a partial view of the deduplication storage area).

In some embodiments of the present invention, a server is coupled to a server storage device, which includes a deduplication storage area. Using storage virtualization, logical volumes present different views of the deduplication storage area, as previously discussed. Clients access the logical volumes in the server storage device via the server. These clients implement a filesystem (within, for example, the clients' operating system) that organizes blocks of data referenced by logical block locations within logical volumes into files. The files can be further organized into directories. With this organization, the filesystem facilities storage, organization, manipulation, and retrieval of blocks of data referenced by the logical block locations of the logical volumes by the clients. A logical block location is referenced in terms of a logical block address. Likewise, a physical block location is referenced in terms of a physical block address.

According to one embodiment, the clients also implement a reverse-mapping manager. Upon receipt of a logical block address corresponding to a logical block location from a logical volume, the reverse-mapping manager maps the logical block address to files organized by a filesystem used by the clients to access the logical volume. The reverse-mapping manager stores the mappings into a mapping data structure. Thus, given a logical block address of a logical volume, the reverse mapping manager, using the mappings stored in the mapping data structure, can identify all the files among the files organized by the filesystem that include the block of data referenced by the logical block location corresponding to the logical block address.

Also, the data deduplication system implements a mapping manager that maps logical block addresses located in logical volumes to physical block addresses corresponding to physical block locations within the deduplication storage area. Thus, given a physical block address corresponding to a physical block location within the deduplication storage area, the mapping manager can identify all logical block locations among the logical volumes that map to the physical block location corresponding to the physical block address.

With the reverse-mapping manager, the mapping data structure, the mapping manager, the ability to identify all logical block locations that map to a particular physical block location, and the capability to reverse map logical block addresses to files organized by a filesystem, some embodiments of the present invention can perform a function on a physical block location in the deduplication storage area and extrapolate the result of the function to files of a filesystem, without actually performing the function on each file of the filesystem. According to one embodiment of the present invention, these functions include: locating sensitive data on a network and preventing the sensitive data from leaking out of an organization by locating duplicate files organized by multiple filesystems on a data deduplication system; locating documents on a network via a string search for strings that are contained within particular documents through indexing of modified logical block locations in a data deduplication device; and securing computer systems from malicious software such as viruses, Trojan horses, and other types of malware by scanning physical block locations in the deduplication storage area and mapping those scanned physical block locations to files organized by multiple filesystems on a deduplication system.

The location of duplicate files organized by multiple filesystems is initiated by the server and performed by the reverse-mapping manager implemented by each client filesystem. For example, the server requests the location of all instances of files organized by filesystems that include blocks of data stored in physical block locations (from a deduplication storage area) P2, P1, and P3, in that order. The mapping manager determines logical block addresses of logical block locations of logical volumes that map to physical block locations P2, P1, and P3. The logical block addresses are forwarded to the reverse-mapping managers of the clients that are accessing the particular logical volumes. The reverse-mapping managers determine the files that correspond to the forwarded logical addresses. Embodiments of the present invention can locate files that include only the data blocks stored in physical block locations P2, P1, and P3 (duplicate files) or files that include the data blocks stored in physical block locations P2, P1, and P3, as well as other data blocks (partial-match files, where the data blocks stored in physical block locations P2, P1, and P3 represent a subset of the data blocks that make up the file).

The search of documents containing particular strings is performed by first generating, using an index manager, an index of logical block addresses and strings referenced by the logical block locations corresponding to those logical block addresses. The index can include an offset to specify the location within the logical block location the string is referenced. In response to receiving a search query that includes a string to be searched, the index manager searches the index for logical block addresses that corresponding to the string included in the search query. The index manager then forwards the list of logical block addresses found in the index (denoting logical block locations that reference the string to be searched) to the reverse-mapping manager. Then, the reverse-mapping manager, using the mapping data structure, generates a list of files corresponding to the logical block addresses from across all logical volumes. The list of files represents documents that include the string to be searched.

The scan of files organized by client filesystems can be accomplished in various ways. A first case involves a complete scan of all files organized by all filesystems across all logical volumes. Such a scan is efficiently accomplished by scanning the physical block locations in a deduplication storage area. Since the filesystems organize the files based on data blocks stored in the deduplication storage area, a scan of all physical block locations will cover all the files as organized by all the filesystems across all logical volumes that map back to the deduplication storage area. A second case involves a partial scan of only modified files following a prior full scan of the physical block locations in the deduplication storage area. The second case is accomplished by identifying unique instances of all modified files (within a scan window) as organized by filesystems across all logical volumes that map to the deduplication storage area.

An Example Architecture for Efficient File Location and Processing

FIG. 1 illustrates a system that locates and processes data files in a data deduplication system, according to one embodiment. As shown, system 100 includes clients 105(1)-(N), which are coupled to communicate with server 120. Clients 105(1)-(N) are coupled to server 120 via a network 115, which can be implemented as a local area network (LAN), storage area network (SAN), wide area network (WAN), and the like.

Server 120 is coupled to a server storage device 125, which stores user data. Server storage device 125 can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Server storage device 125 can include logical volumes that are implemented on an underlying physical storage device (e.g., a RAID system).

When implemented as a block-level deduplication storage device, server storage device 125 maintains a block-level deduplication storage area, discussed herein in more detail in conjunction with FIG. 2B. The block-level deduplication storage area includes a group of physical block locations for storing data. In conjunction with a deduplication manager, deduplication storage area stores only one copy of each block of data within the physical block locations. Clients 105(1)-N) access server 120 to read, write, or otherwise modify data stored in physical block locations of server storage device 125. As previously discussed, a block of data can be of any size and is not limited to any particular unit of disk allocation.

FIG. 2A illustrates a block diagram of clients 105(1)-(2) of FIG. 1, according to one embodiment. While only clients 105(1)-(2) are illustrated in FIG. 2A, other clients coupled to server 120 can be similarly implemented. Also, server 120 can implement a client. As depicted, clients 105(1)-(2) include filesystems 205(1)-(2), reverse mapping managers 210(1)-(2), logical block address (LBA)-to-data file maps 215(1)-(2), and client-to-server modules 220(1)-(2), which can be implemented in memory. According to an embodiment, the memory can be implemented as a persistent memory.

According to one embodiment, filesystems 205(1)-(2) impose a logical structure to the logical block locations of a logical volume. For example, filesystems 205(1)-(2) organize the data stored in the logical block locations into files and directories. Filesystems 205(1)-(2) also map input/output (I/O) requests in terms of offset and length within files to logical block addresses of the logical block locations in the logical volume.

Reverse-mapping managers 210(1)-(2) track modifications by clients 105(1)-(2) to logical volumes stored on server storage device 125. Reverse-mapping managers 210(1)-(2) also maintain reverse maps (e.g., LBA-to-file maps 215(1)-(2)) that can be used to provide filesystem logical block address to file mapping information. In other words, LBA-to-file maps 215(1)-(2) enable reverse-mapping managers 210(1)-(2) to identify at least one file that includes data referenced by a particular logical block location as referenced by a particular logical block address. Filesystems 205(1)-(2) can be used to determine the logical block locations that make up the file and associated logical block addresses. Reverse-mapping mangers 210(1)-(2) can also be configured to determine the logical block locations that make up the file and associated logical block addresses, given a particular file. Client-to-server modules 220(1)-(2), which can be implemented as network cards, enable clients 105(1)-(2) to communicate with server 120 via a network 115.

FIG. 2B illustrates a block diagram of a server, according to one embodiment. Server 120 includes a processing manager 225, an index manager 230, an index 235, a scan manager 240, a mapping manager 245, a metadata manager 250, a server-to-client module 260, and a deduplication manager 265, all of which can be implemented in memory. Note that some embodiments may not implement all modules. For example, some embodiments may perform scanning operations with scan manager 240, but may not implement index manager 230, and do not perform indexing operations. Other embodiments may perform indexing operations with index manager 230, but may not implement scan manager 240, and do not perform scanning operations.

Processing manager 225 operates as the decision maker for the other modules during the various operations and communicates with the clients via server-to-client module 260, which can be implemented as a network card or any type of module for communication with clients. Index manager 230 performs an indexing function on modified blocks within the server storage device. The results of the index function are stored in index 235. According to one embodiment, the index manager 230 indexes modified blocks based on their text string contents, to facilitate text string searches.

Scan manager 240 performs a scanning function on physical block locations within server storage device 125. According to one embodiment, scan manager 240 is an antivirus and/or antispyware module that scans the server storage device for the presence of malicious software (malware). Malware is hostile, intrusive, or annoying computer program code that can be surreptitiously installed on a computer system without the user's knowledge. The presence of malware on a computer system can present a security risk (e.g., by logging user interactions, by using the computer system to steal personal information, or by spreading to other computer systems on the same LAN, and the like).

As previously discussed, a full or partial scan of physical block locations can be performed. For example, scan manager 240 can perform full scan of physical block locations when scan manager 240 is initially installed on a computer system or when new virus (or other types of file) signatures have been updated. Scan manager 240 performs a partial scan of physical block locations (limited to the physical block locations that have been modified during a scan window) after a full scan has been completed.

Mapping manager 245 identifies a physical block location within server storage device 125, in response to receiving a logical block address (LBA) referencing a logical block location within a logical volume. Metadata manager 250 manages various types of metadata used to describe characteristics and connections between physical block locations in server storage device 125. A first type of metadata involves hashes, which are representations of blocks of data stored in physical block locations. As previously discussed, the hashes, or representations of data, are used to identify duplicate copies of the blocks of data for deduplication purposes. A second type of metadata is physical block location metadata, which identifies a first logical block location that maps back to a particular physical block location. A third type of metadata are deduplication chains, which are linked lists (or any other data type or structure) of translations that identify all of the logical block locations across all logical volumes that map to a particular physical block location. The physical block location metadata can be implemented as a first entry (translation) in a deduplication chain.

Server 120 is coupled to server storage device 125, which is implemented as a deduplication storage device. As illustrated, server storage device 120 also includes deduplication storage area 270 and logical volume 1 280(1)-logical volume N 280(N). Logical volume 1 280(1)-logical volume N 280(N) are generated from deduplication storage area 270. For example, logical volume 1 280(1)-logical volume N 280(N) can be implemented as point-in-time copies of deduplication storage area 270. In some embodiments, logical volume 1 280(1)-logical volume N 280(N) are space-optimized logical volumes such as copy-on-write logical volumes. As an example, logical volume 1 280(1)-logical volume N 280(N) can be generated by copying state information (e.g., metadata) associated with the data stored in the physical blocks of deduplication storage area 270 and referencing physical block locations of deduplication storage area 270. Thus, through these logical volume 1 280(1)-logical volume N 280 (N), server 120 presents multiple views of the data stored in deduplication storage area 270 to clients.

According to one embodiment, deduplication storage area 270 stores data within the physical block locations that make up deduplication storage area 270. The physical block locations are used to provide multiple logical volumes that are based on the data blocks stored in the physical block locations. For example, if server 120 provides three separate views of deduplication storage area 270 to three separate clients (e.g., clients 105(1), 105(2), and 105(3) of FIG. 1), three logical volumes 280(1), 280(2), and 280(3) are created. The logical block locations in the logical volumes are mapped back to physical block locations within deduplication storage area 270. For example, a physical block location n within deduplication storage area 270 is mapped by logical block location n of logical volume 1 280(1), logical block location m of logical volume 2 280(2), and logical block location l of logical volume 3 280(3), which are provided for access by the client filesystems of clients 105(1), 105(2), and 105(3).

Figure 3:
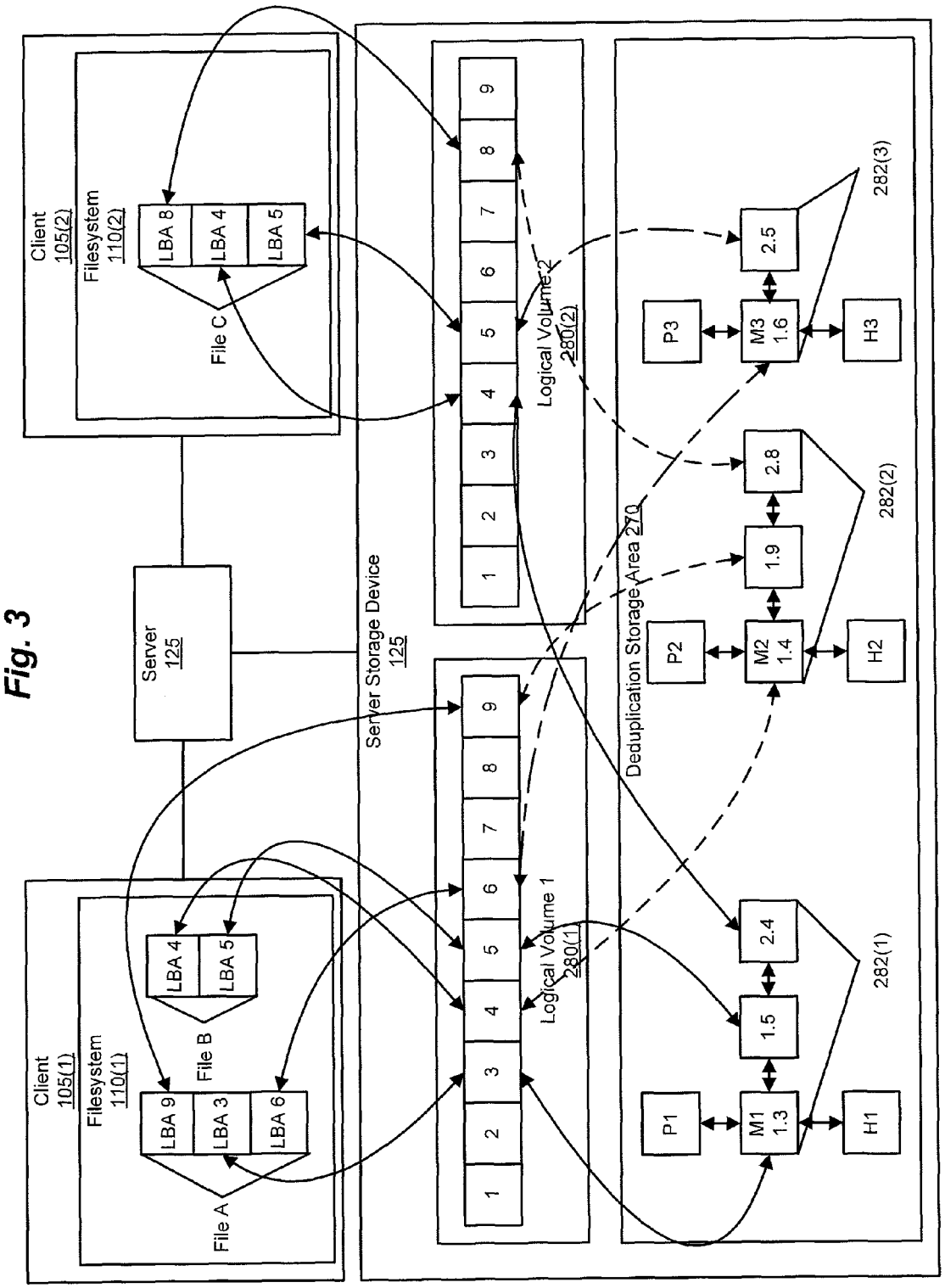
FIG. 3 is a block diagram illustrating an example of mapping relationships between physical block locations and logical block locations on a data deduplication system, according to one embodiment.

FIG. 3 is an example illustration of mapping relationships between logical block locations and physical block locations, according to one embodiment. As illustrated, deduplication storage area 270, located in server storage device 125 includes a collection of physical block locations P1, P2, and P3. Deduplication storage area 270 is not limited to three physical block locations, but can include any number of physical block locations. As previously described, deduplication storage area 270 is implemented so that only one copy of a particular block of data is stored in the physical block locations of deduplication storage area 270. Physical block addresses P1, P2, and P3 are utilized to reference physical block locations P1, P2, and P3, respectively. Associated with physical block locations P1, P2, and P3 are physical block location metadata M1, M2, and M3, respectively. The physical block location metadata includes data describing the physical block locations, such as, for example, data identifying a first logical block location within a first logical volume that maps back to the physical block locations. For example, regarding physical block location metadata M1, the entry "1.3" indicates that the logical block location 3 of logical volume 1 (e.g., logical volume 1 280(1)) maps to physical block location P1 in deduplication storage area 270. Also, as illustrated, physical block location metadata M1, M2, and M3 also refer to hashes H1, H2, and H3. As previously discussed, hashes, or representations of data, are used to identify duplicate copies of the blocks of data for deduplication processes.

Physical block location metadata M1, M2, and M3 are also implemented as a first entry in deduplication chains 282(1)-(3). A deduplication chain is a linked list (or any suitable data type or data structure) of translations that identifies all the logical block locations across all logical volumes in server storage device 125 that map to a particular physical block location. For example, traversing deduplication chain 282(1), starting at physical block metadata M1 indicates that physical block location P1 is mapped by logical block location 3 of logical volume 1 280(1) (i.e., indicated by "1.3"), logical block location 5 of logical volume 1 280(1) (i.e., indicated by "1.5"), and logical block location 4 of logical volume 2 280 (2) (i.e., indicated by "2.4."). Deduplication chains 282(2) and 282(3) are similarly implemented to indicate the logical block locations across other logical volumes that map to particular physical block locations.

In order to provide unique views of the data stored within the physical block locations of deduplication storage area 270, logical volume 1 280(1)-logical volume 2 280(2) are created. Logical volume 1 280(1) and logical volume 2 280(2) include an array of logical block locations that map back to the physical block locations of deduplication storage area 270. As shown in FIG. 3, logical volume 1 280(1) includes a first array of logical block locations 1-9 and logical volume 2 280(2) includes a second array of logical block locations 1-9. Logical volumes 1 280(1) and logical volume 2 280(2) are not limited to nine logical block locations, but can include any number of logical block locations. The logical block locations are referenced using logical block addresses.

As shown in FIG. 3, multiple logical block locations from multiple logical volumes can map back to a single physical block location. Thus, for example, logical block locations 3 and 5 of logical volume 1 280(1) and logical block location 4 of logical volume 280(2) map back to physical block location P1. Deduplication chain 282(1) stores the mapping associations between the logical block locations and physical block location P1. By traversing deduplication chain 282(1), the logical block locations among the logical volumes that map back to physical block location P1 are determined.

Still referring to FIG. 3, clients 105(1)-(2) organize the array of logical block addresses that refer to logical block locations of logical volume 1 280(1)-logical volume 2 280(2) using filesystems 110(1)-(2). Filesystems 110(1)-(2) organize the logical block locations into files and directories of files. As shown in FIG. 3, filesystem 110(1) includes File A and File B. File A includes data referenced by logical block locations 9, 3, and 6, in that order, of logical volume 1 280(1). File B includes data referenced by logical block locations 4 and 5, in that order, of logical volume 1 280(1). Also, filesystem 110(2) includes File C, which includes logical block locations 8, 4, and 5, in that order, of logical volume 2 280(2).

During normal operation of the system, the operating system or applications of client 105(1) can send a data read request for data that is part or all of File A. Filesystem 110(1) accesses logical block locations 9, 3, and 6 of logical volume 1 280(1). Logical block locations 9, 3, and 6 of logical volume 1 280(1) map back to data blocks stored in physical block locations P2, P1, and P3 of deduplication storage area 270. Thus, client 105(1), via filesystem 110(1) retrieves the data from physical block locations P2, P1, and P3, in that order to continue normal operation of the system.

When modifying or writing data to server storage device 125, clients 105(1)-(2) access logical block locations within logical volume 1 280(1) and logical volume 2 280(2). Then, the data blocks are retrieved from the physical block locations within deduplication storage area 270 mapped by the accessed logical block locations. The modified or new blocks of data are written to new physical block locations within deduplication storage area 270. Then, in the case of a modified data block, the logical block location's reference will be rerouted to the new physical block location. If the data block is a new block of data, a logical block location is assigned to the new physical block location and the reference is updated.

FIG. 4 is an example illustration of LBA-to-data file map 215(1) of FIG. 2A, according to an embodiment. As illustrated, logical block address (LBA) field 405 lists the logical block addresses referenced by client 105(1) of FIG. 2A. Clients 105(1)-(N) can reference any number of LBAs and are no way limited to 9 addresses. File identifier field 415 indicates corresponding filenames (for example, File A and File B) of data files that include data referenced by logical block locations referenced by particular LBAs. For example, cells 410 and 420 indicate that, for client 105(1), File A includes the data referenced by logical block location 3. File identifier field 415 can be implemented by any sort of unique file identifier within the filesystem.

Before discussing the data location and processing operations of the system, there are a few basic functions that are useful in the performance of these operations.

A first basic function (referred herein as a physical block address-to-filename function) receives a physical block address as input. Then, this basic function outputs a filename (or, as previously discussed, any sort of unique file identifier), in response to receiving the physical block address. The filename identifies a data file that includes the data stored at the physical block location referenced by the physical block address. Thus, referring to FIG. 3, if the physical block address-to-filename function receives a query including physical block addresses P1 and P2, the function outputs a data file set of File A, File B, and File C, since all three files include the data stored in at least one physical block locations P1 or P2.

According to one embodiment, the physical block address-to-filename function can be performed by a processing manager (e.g., processing manager 245 of FIG. 2B). The processing manager receives a physical block address corresponding to a physical block location and forwards the physical block address to a metadata manager (e.g., metadata manager 250 of FIG. 2B). The metadata manager accesses physical block location metadata and deduplications chains (e.g., physical block location metadata M1, M2, or M3 and deduplication chains 282(1)-(3), all of FIG. 3) to determine the logical block addresses mapped to the physical block location corresponding to the received physical block address. For example, referring back to FIG. 3, physical block address P1 refers to physical block location P1, which also corresponds to physical block location metadata M1. Physical block location metadata M1 and deduplication chain 282(1) identify three logical block locations spread among two different logical volumes 280(1)-(2) that map to physical block location P1. The logical block locations are logical block locations 3 and 5 of logical volume 1 280(1) and logical block location 4 of logical volume 2 280(2). Also, physical block address P2 refers to physical block location P2, which corresponds to metadata M2. Physical block location metadata M2 and deduplication chain 282(2) identify three logical block locations spread among two different logical volumes, logical volume 1 280(1) and logical volume 2 280(2), that map to physical block location P2. The logical block locations are logical block location 9 of logical volume 1 280(1), logical block location 4 of logical volume 1 280(1), and logical block location 8 of logical volume 2 280(2).

The metadata manager forwards a list of logical block addresses corresponding to the identified logical block locations to reverse mapping managers (e.g., reverse mapping managers 210(1)-(2)). The reverse mapping managers reference logical block address-to-data file maps (e.g., LBA-to-data file maps 215(1)-(2)) to determine the data files that include data stored in at least one logical block location corresponding to the received logical block addresses. According to one embodiment, the reverse mapping managers and logical block address-to-data file maps do not have to be located on the clients, but can be implemented on the server as well.

As an example of the physical block address-to-filename function, referring back to FIG. 3, a query for physical block locations P1 and P2 results in a data file set of File A, File B, and File C since all three files include the data stored in at least one physical block location P1 or P2. The physical block address-to-filename function's output is determined by accessing physical block location metadata M1 and M2 and deduplication chains 282(1)-(2) to determine the logical block addresses that map from physical block locations P1 and P2. Those logical block addresses are logical block address 3 of logical volume 1 280(1), which corresponds to File A; logical block address 5 of logical volume 1 280(1), which corresponds to File B; logical block address 4 of logical volume 2 280(2), which corresponds to File C; logical block address 9 of logical volume 1 280(1), which corresponds to File A; logical block address 4 of logical volume 1 280(1), which corresponds to file B; and logical block address 8 of logical volume 2 280(2), which corresponds to File C.

Another basic function (ordered physical block address-to-filename function) receives a list of physical block addresses as input. In response to receiving the list of physical block addresses, the ordered physical block address-to-filename function outputs a list of data filenames. The ordered physical block address-to-filename function operates similar to the physical block address-to-filename function, but instead of returning a file that includes the data stored at the physical block location referenced by a physical block address, the ordered physical block address-to-filename function returns a filename of a file that includes the data stored at all the physical block locations referenced by the physical block addresses, in the order that the physical block addresses appear on the list. Thus, referring to FIG. 3, if the ordered physical block address-to-filename function receives a query including physical block addresses P2, P1, and P3, the function outputs a data file set of File A and File C, since both files include data stored in physical block locations P2, P1, and P3, in that order.

The ordered physical block addresses-to-filename function can also support different types of queries. For example, a "return identical files" query might include a list of physical block addresses in a particular order and an indicator to return only files that include data stored at the physical block locations referenced by the physical block addresses. The list of filenames returned by the function is a list of all files identical to the data stored in the physical block locations referenced by the physical block addresses in the list. Another query can request filenames of files that include the data stored in the physical block locations referenced by the physical block addresses in the list, but also include other data.

Another basic function (referred to herein as a complete data file set function) involves receiving a physical block address, identifying a first data file that includes data stored at a physical block location referenced by the physical block address, and identifying all other physical block addresses and all other data files related to the first data file by using deduplication chains, as described in relation to the deduplication chain of physical block location P1 in FIG. 3. For example, in response to receiving a first physical block address, the function identifies a first data file. The first data file includes data stored at a first physical block location referenced by the first physical block address, as well as data stored at a second and a third physical block location. The data stored at the second and third physical block location can be included in other data files, which are identified by the function. The physical block locations storing data included in the other data files are also identified by the function. The function outputs a list of filenames of the files identified by the function.

For example, referring back to FIG. 3, a query for physical block address P1 is received by the processing manager, which is executing the complete data file set function. The processing manager instructs the metadata manager to access physical block location metadata M1, which indicates that physical block location P1 maps to logical block address 3 of logical volume 1 280(1). The reverse mapping manager (using a LBA-to-data file map such as LBA-to-data file maps 215(1)-(2)) indicates that logical block address 3 of logical volume 280(1) corresponds to File A. File A also includes logical block address 9 of logical volume 280(1) and logical block address 6 of logical volume 1 280(1). Logical block address 3 of logical volume 1 280(1) maps to physical block address P2 and logical block address 9 of logical volume 1 280(1) maps to physical block address P3. Referring back to physical block location metadata M1 and deduplication chain 282(2), the reverse mapping manager indicates that physical block location P1 maps to logical block address 5 of logical volume 1 280(1). Logical block address 5 of logical volume 1 280(1) corresponds to File B. File B also includes logical block address 4 of logical volume 1 280(1), which maps to physical block address P2. Referring back to deduplicatin chain 282(2) a final time, the reverse mapping manager indicates that physical block location P1 maps to logical block address 4 of logical volume 2 280(2), which corresponds to File C. File C also includes logical block address 8 of logical volume 2 280(2), which maps to physical block address P2. Also, File C includes logical block address 5 of logical volume 1 280(1), which maps to physical block address P3. The above process continues with the other identified physical block addresses P2 and P3. The final output from a query of physical block address of P1 is P1, P2, and P3 and File A, File B, and File C.

The basic functions can be modified such that identical files (e.g., files with identical data stored in the same ordered physical block locations) are identified and grouped as a single instance. For example, once a basic function has executed, the output can be modified such that any identical files in the output list are grouped together. Identifying identical files in an output list uses, for example, the ordered physical block addresses-to-data files function, as previously described.

Figure 5A:
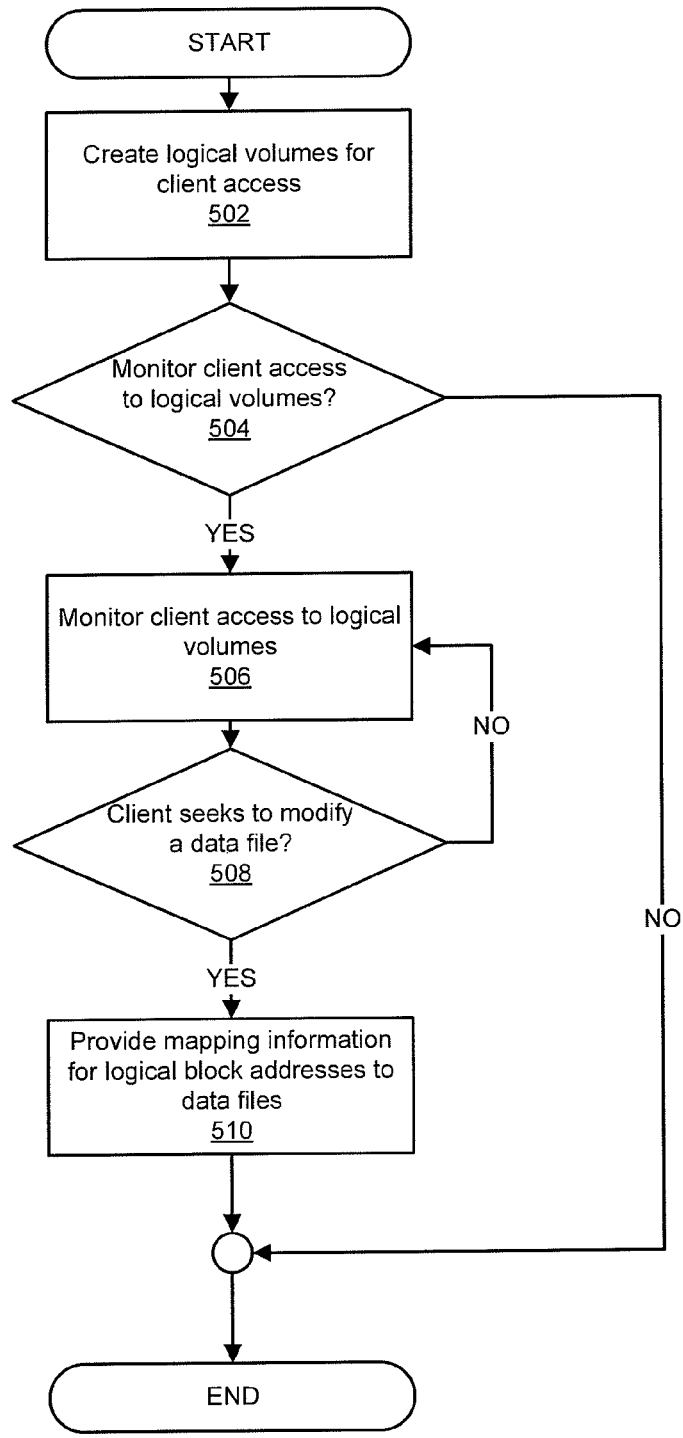
FIG. 5A illustrates a method for providing mapping information for mapping logical block addresses to data files in a data deduplication system, according to one embodiment.

FIG. 5A is a simplified flowchart illustrating a method for providing mapping information for mapping logical block addresses to data files in a data deduplication system, according to one embodiment. According to one embodiment, the modifications to the deduplication storage area are processed in a deduplication operation by a deduplication manager (e.g., deduplication manager 265 of FIG. 2B) to ensure that only one instance of a block of data is stored in the deduplication storage area.

The procedure of FIG. 5A begins with a system, such as server 120 of FIG. 1, clients 105(1)-(N) of FIG. 1, or the server-client system of FIG. 1, creating logical volumes (e.g., logical volume 1 280(1)-logical volume N 280(N) of FIG. 2B) of a deduplication storage area (e.g., deduplication storage area 270), as shown in 502. According to one embodiment, the logical volumes are space-optimized snapshots. Modifications to data blocks stored in the logical volumes are stored in the deduplication storage area for further processing, as later discussed in more detail.

According to one embodiment, the logical address space of the logical volumes can be translated using, for example, a B+tree data structure (not shown) to the physical block address space on the backend storage (e.g., deduplication storage area 270). If a client changes an area referenced by the logical volume (e.g., writing new data to the deduplication storage area or modifies existing data of the deduplication storage area), the new data is allocated in the deduplication storage area and the logical-to-physical translation for the logical volume is updated within the B+Tree data structure to point to the new location in the deduplication storage area, rather than the old data in the prior location within the deduplication storage area. Subsequently, lookups for block access in the logical volumes are handled by the B+Tree data structure. Also, any address that requires a translation represents updated data for the logical volume.

If the file or data has been modified, the data blocks that make up the file are stored in a new location in a deduplication storage area. A data structure, such as the B+Tree data structure intercepts a data access request from the client and redirects the request from the original location in the deduplication storage area to the location of the modified data in the deduplication storage area.

If the monitoring of client access to the logical volume is desired (504), a reverse mapping manager (e.g., reverse mapping manager 210(1) of FIG. 2A) monitors client access to logical volumes, as shown in 506. If the reverse-mapping manager determines that the client seeks to modify data (508), the reverse mapping manager generates mapping information for logical block addresses associated with the data, as shown in 510, and stores the mapping information into a mapping data structure (e.g., logical block address-to-data file maps 215(1)-215(2)).

Figure 5B:
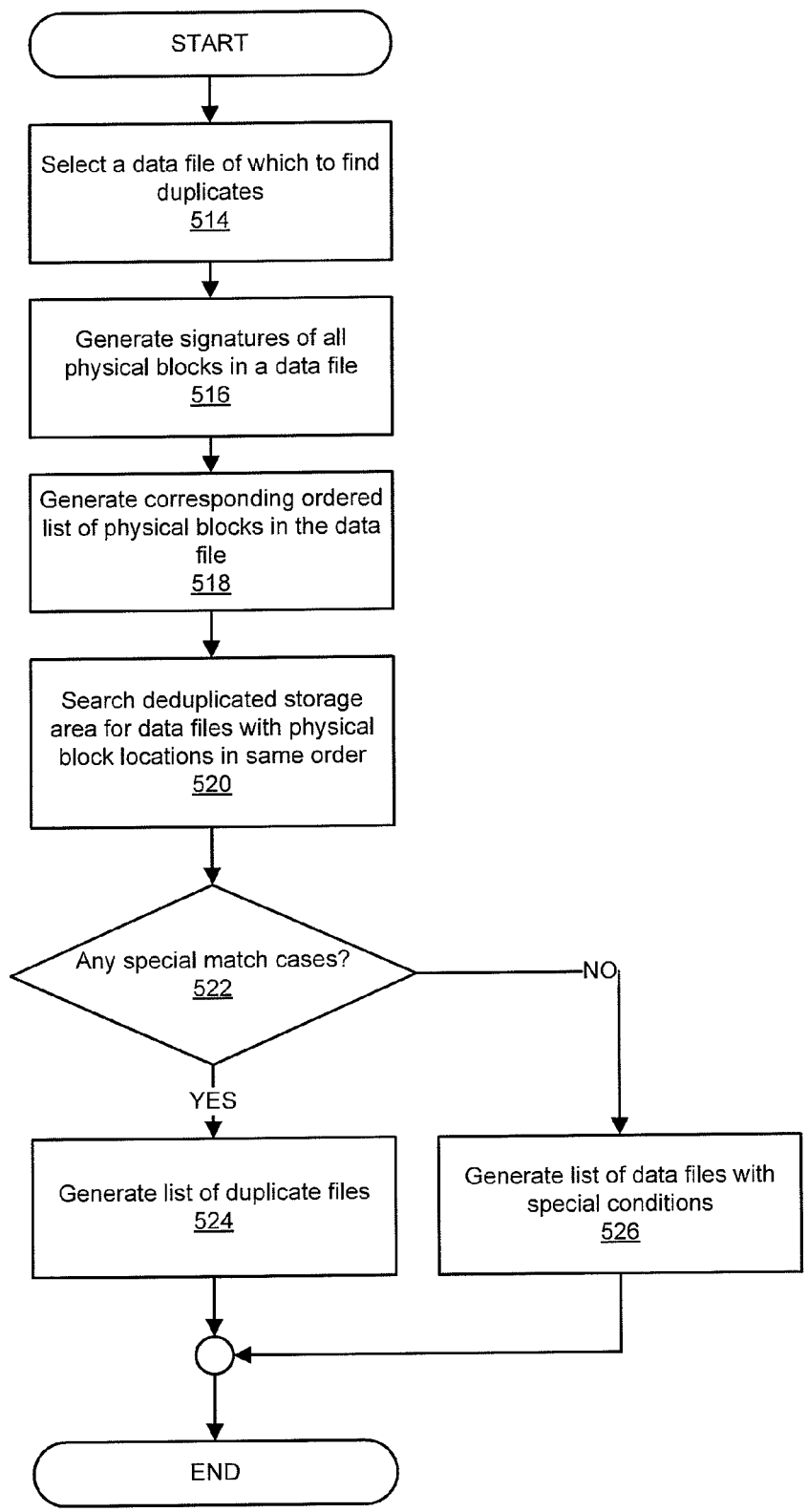
FIG. 5B illustrates a method for locating duplicate files in a logical volume in a data deduplication system, according to one embodiment.

FIG. 5B is a simplified flowchart illustrating a method for finding duplicate data files in a deduplication storage device according to an embodiment. The procedure of FIG. 5B begins with a mapping manager (e.g., mapping manager 245 of FIG. 2B) selecting a data file of which to find duplicates within the server storage device, shown in 514. As previously discussed, data files include data stored in at least one physical block location on the server storage device. To facilitate finding duplicates of a particular data file, as organized by multiple filesystems, the mapping manager determines the physical block locations that store the data included in the particular data file.

Then, a metadata manager (e.g., metadata manager 250 of FIG. 2B) calculates a signature (e.g., a hash or checksum) for the data stored in each location, shown in 516. The mapping manager generates an ordered list of physical block locations, shown in 518. The mapping manager, in conjunction with the reverse mapping manager of the client, tracks data files (using the generated signatures) in all logical volumes that include data stored in physical block locations in the same order, shown in 520, which is earlier described as a "ordered physical block locations-to-data files function".

For example, for each physical block location in the ordered list, the mapping manager accesses the metadata corresponding to the physical block location. The metadata, which, as previously discussed, identifies the logical block addresses in various logical volumes mapping to the same physical block location in the deduplication storage volume. The logical block addresses are forwarded to the client via a server-to-client module (e.g., server-to-client module 260 of FIG. 3B). The reverse mapping manager receives the logical block addresses and identifies data files within the deduplication storage volume with the particular logical block addresses, as shown in 524. According to one embodiment, the reverse mapping manager can be provided, by a processing manager (e.g., processing manager 225 of FIG. 2B), at least one special match case for use when generating the list of duplicate files, as shown in 522. A special match case involves the different types of queries (e.g., data files that are a exact match of data in physical block locations referenced by the list of physical addresses in the query, and the like) previously discussed in conjunction with the ordered physical block locations-to-data files operation. If there is at least one special match case for the generated list of duplicate files, the reverse mapping manager will generate the list according to the special match case, shown in 526. For example, if the processing manager requests a list of exact duplicate files, the generated list includes files that are exact duplicates of the selected data file.

Figure 5C:
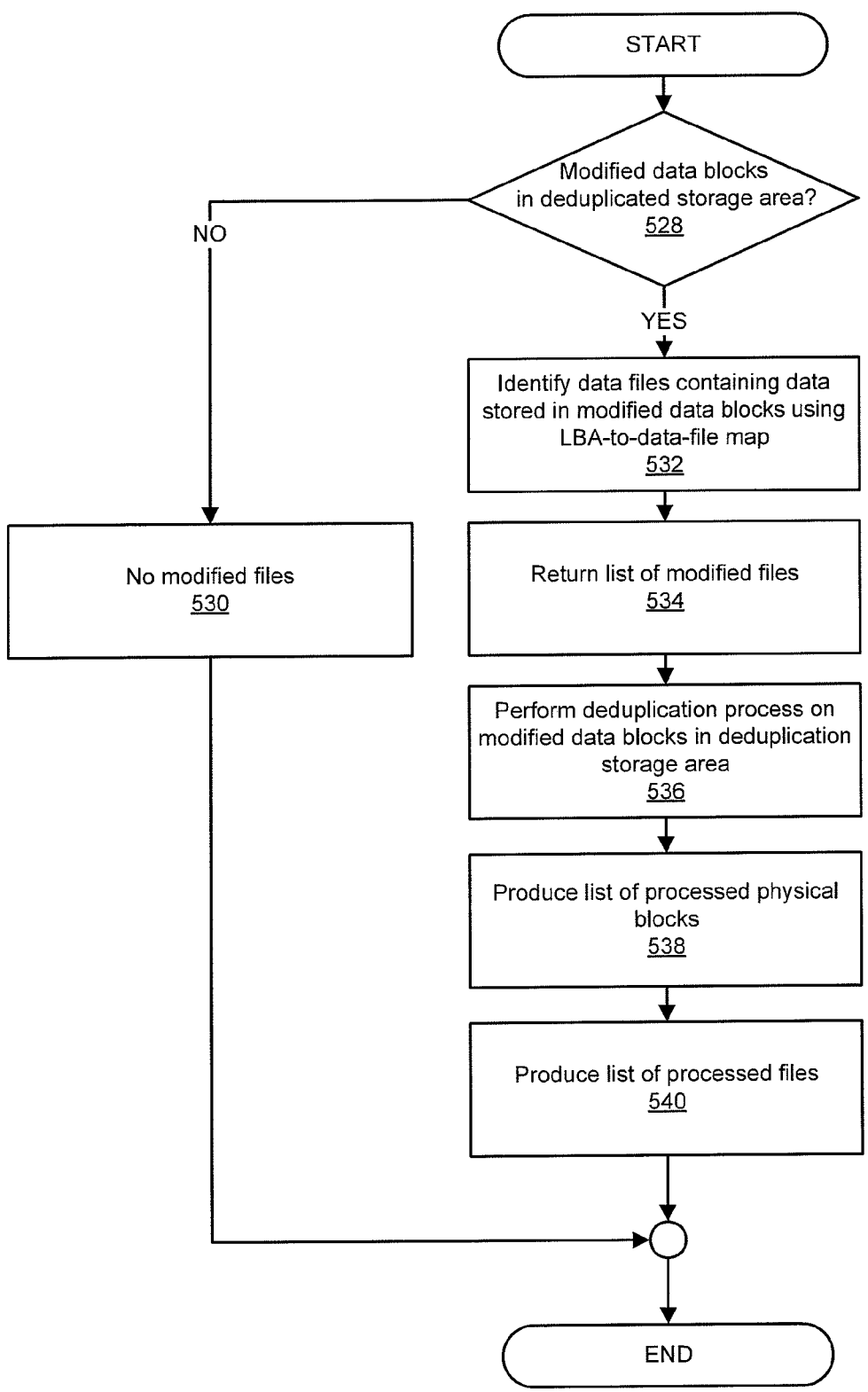
FIG. 5C illustrates a method for producing a list of modified files and processed files in a logical volume in a data deduplication system, according to one embodiment.

FIG. 5C is a simplified flowchart illustrating a method for identifying modified files in a deduplication storage device. According to one embodiment, identifying modified data files in the deduplication storage device enables: (1) the indexing and searching of strings in data files from a large number of similar filesystems that share a common deduplication storage device; and (2) the scanning of unique instances of files from a large number of similar filesystems that share a common deduplication storage device.

The procedure of FIG. 5C begins with the reverse-mapping manager determining if there are any modified blocks in the deduplication storage area, as shown in 528. According to one embodiment, such a determination occurs after a predetermined time period. For example, during operation, the system can generate a number of modified or new physical block locations in response to clients modifying or adding data to the physical block locations. These modified physical block locations are stored in the deduplication storage are, and have not yet been indexed or scanned, since they were modified during the window defined by the predetermined time period.

If there are no modified data blocks in the deduplication storage area, the reverse mapping manager indicates that there are no modified blocks or files, as shown in 530. If there are modified or newly added data blocks in the deduplication storage area, the reverse mapping manager identifies data files containing data stored in the modified data blocks using the LBA-to-data-file map, as shown in 532. The reverse mapping manager then identifies the data files containing data stored in the modified data blocks as "modified files" and generates a "modified files" list, as shown in 534. The server performs a deduplication process (using, e.g., deduplication manager 265) on the modified data blocks in the deduplication storage area, as shown in 536.

As previously discussed, a deduplication process is performed by a deduplication manager (e.g., deduplication manager 265) when the server identifies redundant copies of the same data within the deduplication storage area. According to an embodiment, the server calculates a signature (e.g., a hash or checksum) for each modified data block and then compares that signature to other signatures of the data blocks stored in the deduplication storage area. If the signatures match, the match indicates that another copy of the data block is likely to be already stored in the deduplication storage area (additional comparisons may be needed to verify such an indication, in certain circumstances).

Once all the modified data blocks have been processed, the server generates a "processed physical blocks" list, shown in 538. The reverse mapping manager receives the "processed physical blocks" lists, and with the help of a device manager (not shown) performs physical-to-logical block address translations. The reverse mapping manager produces a list of processed files by mapping the list of logical block addresses (received from the device manager's physical-to-logical block address translations) to a list of data files using the LBA-to-data-files map, as shown in 540.

Figure 6A:
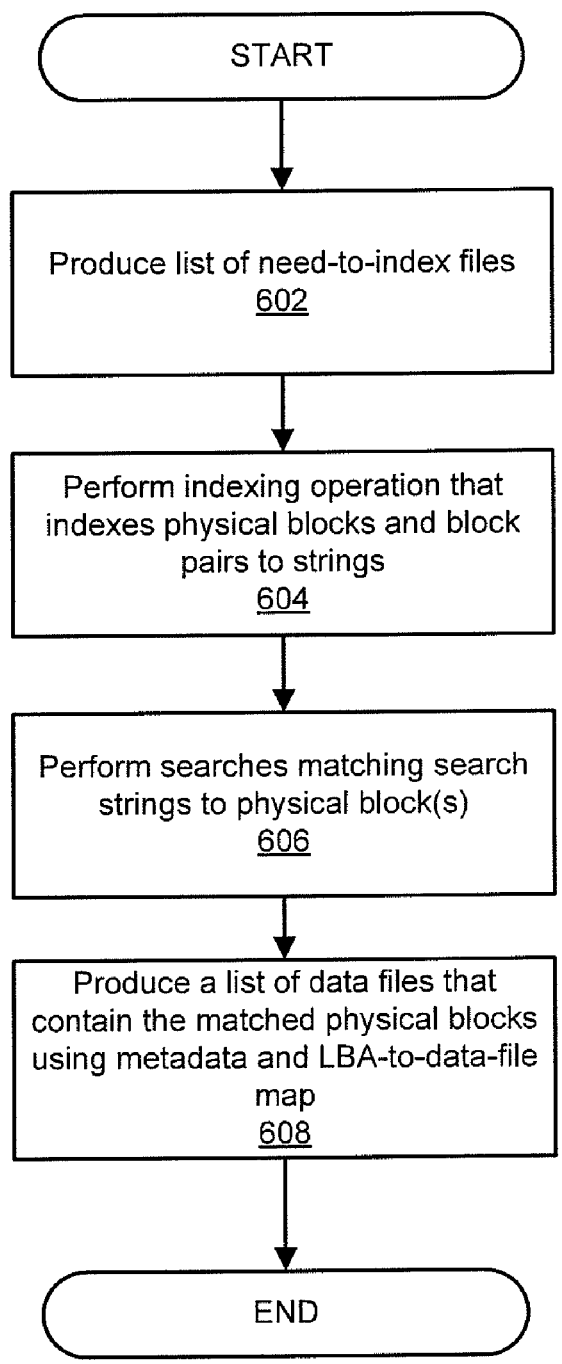
FIG. 6A illustrates a method for performing a string search in a collection of data files in a data deduplication system, according to one embodiment.
Figure 6B:
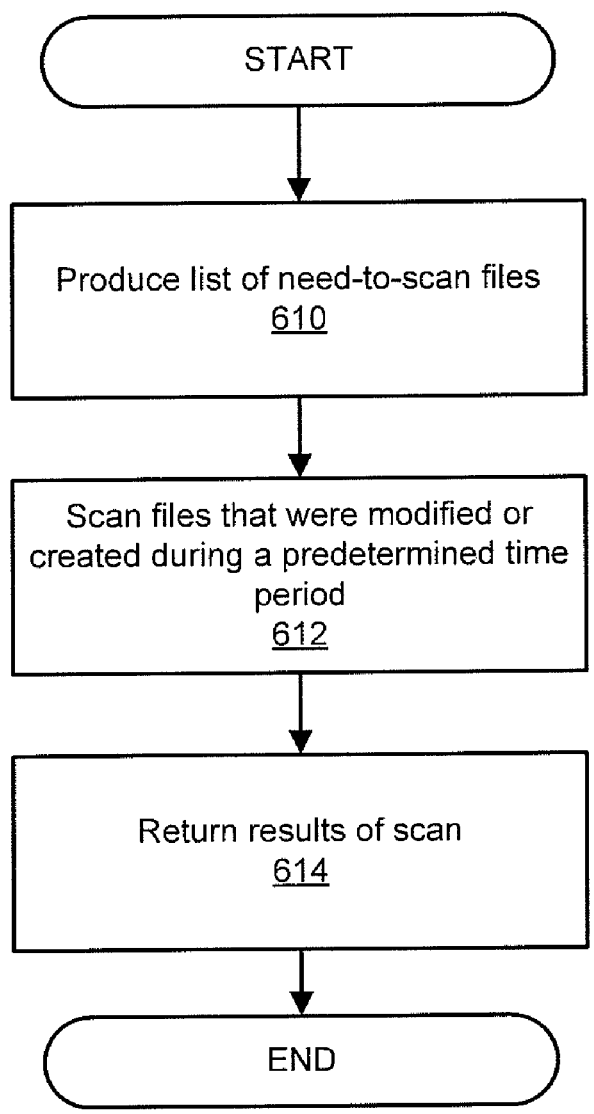
FIG. 6B illustrates a method for performing a data file scan in a collection of data files in a data deduplication system, according to one embodiment.

Referring now to FIG. 6A (indexing and searching of files) and FIG. 6B (scanning of files), at any time during the process described in FIG. 5A-5C, a processing manager (e.g., processing manager 225 of FIG. 2B) determines if an indexing operation or a scanning operation is requested. The request for an indexing or scanning operation depends on requests sent by an operating system or application executing on a client. If an indexing operation is requested, an index manager (e.g., index manager 230 of FIG. 2B) requests a "need-to-index files" list and performs an indexing operation. A need-to-index files list is generated by selecting files from the "processed files list" generated in 538 that appear in the "modified files" list, shown in 602. Then, the index manager performs the indexing operation, as shown in 604, which generates an index (e.g., index 235 of FIG. 2B). According to one embodiment, the index includes an entry for each physical block address or physical block address pair (in the event that a string spans more than one physical block location). The entry contains information identifying each physical block address or physical block address pair that includes an associated string, the associated string, and an offset (if necessary) that dictates where the string starts within the physical block location or physical block location pair referenced by the physical block address or physical block address pair.

Then, the index manager performs searches that match search strings to physical block addresses or physical block address pairs. According to one embodiment, the search can be performed using the "ordered physical block addresses-to-filename" function, where an ordered list of physical block addresses are matched with physical blocks locations in the deduplicated files stored in the deduplication storage volume, as shown in 606. For example, in response to receiving a particular string, the index manager searches the index for all entries that store the particular string and then determine the physical block address from the entries. Once those physical block locations are found, the reverse mapping manager determines the filenames of the files that contain the particular string. After the search operation is complete, a list of data files that contain the matched physical block locations are produced, as shown in 608.

Referring now to FIG. 6B, if a scanning operation is requested, a scan manager (e.g., scan manager 240 of FIG. 2B) requests a "need-to-scan files" list, as shown in 610. A need-to-scan files list is generated by selecting files from the "processed files list" generated in 538 that appear in the "modified files" list. The scanning operation performs a scan of the data files in the "need-to-scan files" list, as shown in 612. Finally, the scan manager returns the results of the scan, shown in 614. According to one embodiment, the scan of the files involves identifying the logical block locations storing data for the files on the need-to-scan list. Then, the physical block addresses corresponding to the logical block locations are determined using the metadata (e.g., metadata and deduplication chains 255) associated with the physical block locations referenced by the physical block addresses. Those physical block locations are scanned, for example, for malware. Using the ordered physical block location-to-filename function, other files in the server storage device (e.g., in logical volume 1 280(1)-logical volume N 280(N)) that include data that are stored logical block locations mapped to the scanned physical block locations are not scanned, since that data has already been scanned once before. Thus, when only scanning the physical block locations in the server storage device, determining the files that include data with logical block locations mapping to the physical locations reduces the number of scans needed. Without such a scanning procedure, all of the files in all of the logical volume 1 280(1)-logical volume N 280(N) must be scanned, which is much more time consuming than scanning the underlying physical block locations. According to one embodiment, a full scan of the physical block locations in the deduplication storage area can be requested instead of the physical block locations underlying the "need to scan files" as previously discussed. For example, if the scan manager is implemented as an anti-malware scanner, scanning new or newly-modified files is desirable if a full scan of all the files has been performed in the past. Performing a partial scan is a more efficient use of time and system resources. However, if the anti-malware scanner has been recently updated with, for example, updated malware signatures, a full scan of the files is needed to determine if the updated malware signatures identify previously-undetected malware in the files.

An Example Architecture for Data Location and Processing in a Deduplication Storage System Elements of the system can be implemented using a variety of computer systems and networks. An example of one such computing environment is described below with reference with FIG. 7.

Figure 7:
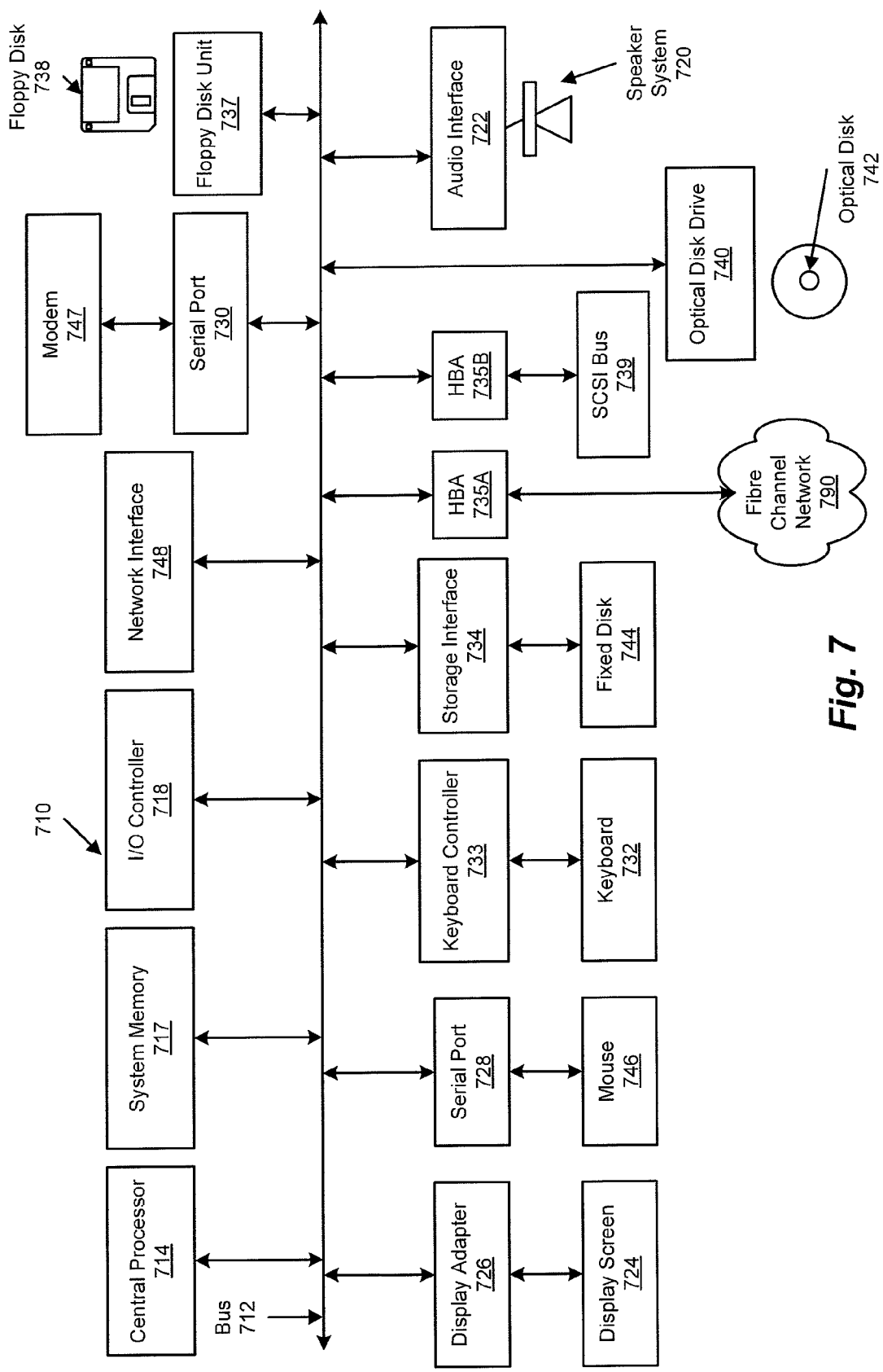
FIG. 7 is a block diagram that illustrates an example of a computer system suitable for implementing embodiments of the present invention.

FIG. 7 depicts a block diagram of a computer system 710 suitable for implementing a server (e.g., server 120 of FIG. 1) as well as the clients (e.g., clients 105(1)-(N) of FIG. 1). Computer system 710 includes a bus 712 which interconnects major subsystems of computer system 710, such as a central processor 714, a system memory 717 (typically random-access memory (RAM), but which may also include read-only memory (ROM), flash ROM, or the like), an input/output controller 718, an external audio device, such as speaker system 720 via an audio output interface 722, an external device, such as a display screen 724 via display adapter 726, serial ports 728 and 730, a keyboard 732 (interfaced with keyboard controller 733), a storage interface 734, a floppy disk drive 737 operative to receive a floppy disk 738, a host bus adapter (HBA) interface card 735A operative to connect with a Fibre Channel network 790, a host bust adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown) and random access memory (RAM) (not shown), as previously noted. RAM is generally the main memory into which operating system and application programs are loaded. ROM or flash memory can contain, among other code, the Basic Input-Output system (BIOS) which controls basic hardware operation such as the interaction with peripheral components. Applications resident with computer system 710 are generally stored on and accessed via a computer-readable medium, such as hard disk drive (e.g., fixed disk 744), an optical drive (e.g., optical drive 740), a floppy disk unit 737, or other storage medium.

Storage interface 734, as with other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a point-of-presence (POP). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 7 need not be present. The devices and subsystems can be interconnected in different ways from that shown in FIG. 7. The operation of the computer system such as that shown in FIG. 7 is readily known in the art and is not discussed in detail in this application. Code to implement the previously-described features can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or other known operating system.

As an example implementation of computer system 710, clients 105(1)-(N) can store reverse mapping managers 210(1)-(N), logical block address-to-data file maps 215(1)-(N), and client-to-server modules 220(1)-(N) in computer-readable storage media (e.g., memory 717 and the like). Regarding server 125, processing manager 225, index manager 230, index 235, scan manager 240, mapping manager 245, metadata manager 250, server-to-client module 260, and deduplication manager 265 may also be stored in computer-readable storage media (e.g., memory 717 and the like) and executed by central processor 714 to perform the features described herein. Also, network interface 748 may be used by any of the modules described in clients 105(1)-(N) to communicate with the modules described in server 125, or vice versa. For example, mapping manager 245 of server 125 can communicate (e.g., send a list of logical block addresses) with a reverse mapping manager 210(1)-(N) via the server-to-client module 260, which can be implemented in computer-readable storage media or by network interface 748.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    mapping a logical volume to a deduplication storage area, wherein
        the logical volume comprises a plurality of logical block locations,
        the deduplication storage area comprises a plurality of physical block locations, and
        the plurality of logical block locations are mapped to the plurality of physical block locations;
    organizing the logical volume into a filesystem, wherein
        the filesystem organizes the plurality of logical block locations into a plurality of files;
    modifying at least one file of the plurality of files, wherein
        the modifying modifies data within at least one physical block location of the plurality of physical block locations;
    in response to the modifying, generating reverse mapping information for at least one logical block location of the plurality of logical block locations, wherein
        the at least one logical block location is mapped to the at least one physical block location, and
        the reverse mapping information associates the at least one logical block location and the at least one file with one another; and
    in response to receiving a logical block address of the at least one logical block location, identifying the at least one file by accessing the reverse mapping information.

2. The method of claim 1, further comprising:
    generating an ordered list of physical block locations that store data for a second file, wherein
        the deduplication storage area comprises at least one duplicate instance of the second file;
    tracking the at least one duplicate instance of the second file; and
    identifying an ordered list of logical block addresses corresponding to an ordered first list of logical block locations, wherein
        the ordered first list of logical block locations are mapped to the ordered list of physical block locations.

3. The method of claim 2, further comprising:
    receiving the ordered list of logical block addresses;
    identifying the at least one duplicate instance of the second file comprising the ordered list of logical block addresses; and
    generating a list of the least one duplicate instance of the second file.

4. The method of claim 1, further comprising:
    identifying processed data blocks in the deduplication storage area, wherein the processed data blocks are data blocks that have been deduplicated; and
    identifying processed files in the deduplication storage area that comprise the processed data blocks.

5. The method of claim 4, further comprising:
    generating an index based on the processed files, wherein
        the index comprises an entry for each string of the processed files, and
        the entry further comprises one or more physical block addresses that comprise the each string;
    in response to a query for a string, performing a search of the index to identify one or more entries of the index comprising the string; and
    determining corresponding physical block addresses for the one or more entries.

6. The method of claim 5, further comprising:
    producing a list of files that comprises the corresponding physical block addresses.

7. The method of claim 4, further comprising:
    scanning each of the processed files, wherein
        the scanning comprises
            identifying a first set of logical block locations storing data for the processed files, and
            scanning the first set of physical block locations.

8. A system comprising:
    one or more processors;
    memory, comprising instructions for execution on the one or more processors, the instructions for
        mapping a logical volume to a deduplication storage area, wherein
            the logical volume comprises a plurality of logical block locations,
            the deduplication storage area comprises a plurality of physical block locations, and
            the plurality of logical block locations are mapped to the plurality of physical block locations;
        organizing the logical volume into a filesystem, wherein
            the filesystem organizes the plurality of logical block locations into a plurality of files;
        modifying at least one file of the plurality of files, wherein
            the modifying modifies data within at least one physical block location of the plurality of physical block locations;
        in response to the modifying, generating reverse mapping information for at least one logical block location of the plurality of logical block locations, wherein
            the at least one logical block location is mapped to the at least one physical block location, and
            the reverse mapping information associates the at least one logical block location and the at least one file with one another; and
        in response to receiving a logical block address of the at least one logical block location, identifying the at least one file by accessing the reverse mapping information.

9. The system of claim 8, wherein the instructions are further for:
    generating an ordered list of physical block locations that store data for a second file, wherein the deduplication storage area comprises at least one duplicate instance of the second file;
tracking the at least one duplicate instance of the second file; and
identifying an ordered list of logical block addresses corresponding to an ordered first list of logical block locations, wherein
the ordered first list of logical block locations are mapped to the ordered list of physical block locations.

10. The system of claim 9, wherein the instructions are further for:
receiving the ordered list of logical block addresses;
identifying the at least one duplicate instance of the second file comprising the ordered list of logical block addresses; and
generating a list of the least one duplicate instance of the second file.

11. The system of claim 8, wherein the instructions are further for:
identifying processed data blocks in the deduplication storage area, wherein the processed data blocks are data blocks that have been deduplicated; and
identifying processed files in the deduplication storage area that comprise the processed data blocks.

12. The system of claim 11, wherein the instructions are further for:
generating an index based on the processed files, wherein
the index comprises an entry for each string of the processed files, and
the entry further comprises one or more physical block addresses that comprise the each string;
in response to a query for a string, performing a search of the index to identify one or more entries of the index comprising the string; and
determining corresponding physical block addresses for the one or more entries.

13. The system of claim 12, wherein the instructions are further for:
producing a list of files that comprises the corresponding physical block addresses.

14. The system of claim 11, wherein the instructions are further for:
scanning each of the processed files, wherein
the scanning comprises
identifying a first set of logical block locations storing data for the processed files, and
scanning the first set of physical block locations.

15. A computer-readable storage medium comprising computer-readable program code, when executed by a processor, execute instructions for:
mapping a logical volume to a deduplication storage area, wherein
the logical volume comprises a plurality of logical block locations,
the deduplication storage area comprises a plurality of physical block locations, and
the plurality of logical block locations are mapped to the plurality of physical block locations;
organizing the logical volume into a filesystem, wherein
the filesystem organizes the plurality of logical block locations into a plurality of files;
modifying at least one file of the plurality of files, wherein
the modifying modifies data within at least one physical block location of the plurality of physical block locations;
in response to the modifying, generating reverse mapping information for at least one logical block location of the plurality of logical block locations,
wherein
the at least one logical block location is mapped to the at least one physical block location, and
the reverse mapping information associates the at least one logical block location and the at least one file with one another; and
in response to receiving a logical block address of the at least one logical block location, identifying the at least one file by accessing the reverse mapping information.

16. The computer-readable storage medium of claim 15, wherein the instructions are further for:
generating an ordered list of physical block locations that store data for a second file, wherein
the deduplication storage area comprises at least one duplicate instance of the second file;
tracking the at least one duplicate instance of the second file; and
identifying an ordered list of logical block addresses corresponding to an ordered first list of logical block locations, wherein
the ordered first list of logical block locations are mapped to the ordered list of physical block locations.

17. The computer-readable storage medium of claim 16, wherein the instructions are further for:
receiving the ordered list of logical block addresses;
identifying the at least one duplicate instance of the second file comprising the ordered list of logical block addresses; and
generating a list of the least one duplicate instance of the second file.

18. The computer-readable storage medium of claim 15, wherein the instructions are further for:
identifying processed data blocks in the deduplication storage area, wherein the processed data blocks are data blocks that have been deduplicated; and
identifying processed files in the deduplication storage area that comprise the processed data blocks.

19. The computer-readable storage medium of claim 18, wherein the instructions are further for:
generating an index based on the processed files, wherein
the index comprises an entry for each string of the processed files, and
the entry further comprises one or more physical block addresses that comprise the each string;
in response to a query for a string, performing a search of the index to identify one or more entries of the index comprising the string;
determining corresponding physical block addresses for the one or more entries; and
producing a list of files that comprises the corresponding physical block addresses.

20. The computer-readable storage medium of claim 18, wherein the instructions are further for:
scanning each of the processed files, wherein
the scanning comprises
identifying a first set of logical block locations storing data for the processed files, and
scanning the first set of physical block locations.

* * * * *